United States Patent
Wilkinson

(10) Patent No.: US 12,169,579 B1
(45) Date of Patent: *Dec. 17, 2024

(54) SYSTEMS AND METHODS FOR MONITORING EMAIL TEMPLATE USAGE

(71) Applicant: United Services Automobile Association (USAA), San Antonio, TX (US)

(72) Inventor: Christopher Thomas Wilkinson, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,672

(22) Filed: Apr. 19, 2023

Related U.S. Application Data

(63) Continuation of application No. 17/317,548, filed on May 11, 2021, now Pat. No. 11,663,353.

(60) Provisional application No. 63/045,607, filed on Jun. 29, 2020.

(51) Int. Cl.
  *G06F 21/00* (2013.01)
  *G06F 21/44* (2013.01)
  *G06F 21/62* (2013.01)

(52) U.S. Cl.
  CPC .......... *G06F 21/6218* (2013.01); *G06F 21/44* (2013.01)

(58) Field of Classification Search
  CPC ............................ G06F 21/44; G06F 21/6218
  See application file for complete search history.

(56) References Cited

U.S. PATENT DOCUMENTS

| | | | |
|---|---|---|---|
| 5,706,210 A * | 1/1998 | Kumano | H04L 43/10 709/224 |
| 7,146,382 B2 * | 12/2006 | Yamamoto | G06F 16/5838 |
| 10,055,747 B1 | 8/2018 | Sherman et al. | |
| 10,686,781 B1 | 6/2020 | Kaditz et al. | |
| 11,302,156 B1 | 4/2022 | Gordiichuk et al. | |
| 2002/0035607 A1 * | 3/2002 | Checkoway | H04L 9/40 709/206 |
| 2003/0028814 A1 | 2/2003 | Carta et al. | |
| 2004/0005921 A1 | 1/2004 | Shinoda | |
| 2006/0168072 A1 * | 7/2006 | Park | G06Q 10/107 709/206 |
| 2008/0022396 A1 | 1/2008 | Kado | |
| 2011/0055172 A1 | 3/2011 | Tan et al. | |
| 2014/0270408 A1 | 9/2014 | Hutchison, IV et al. | |
| 2015/0294349 A1 * | 10/2015 | Capel | H04W 4/02 705/14.43 |
| 2017/0013071 A1 | 1/2017 | McCrea | |
| 2017/0155669 A1 | 6/2017 | Sudo et al. | |

(Continued)

*Primary Examiner* — Rodman Alexander Mahmoudi
(74) *Attorney, Agent, or Firm* — Fletcher Yoder, P.C.

(57) ABSTRACT

A system includes a server configured to store a plurality of imagery configured to be presented in an email template on an electronic device. The server is configured to receive a request to retrieve an imagery of the plurality of imagery for use in the email template. The system also includes a controller configured to perform operations that include monitoring information associated with the request, comparing monitored information associated with the request with expected information associated with the request, and determining unauthorized usage of the email template based on a mismatch between the monitored information and the expected information.

20 Claims, 4 Drawing Sheets

(56) References Cited

U.S. PATENT DOCUMENTS

2018/0234368 A1    8/2018  Everton
2019/0132419 A1*  5/2019  Wang .................... G06F 9/4881
2019/0312884 A1  10/2019  Vinukonda et al.
2020/0007466 A1    1/2020  Tsiatsikas et al.
2021/0099412 A1*  4/2021  Bikumala ............. H04L 51/214

* cited by examiner

SYSTEMS AND METHODS FOR MONITORING EMAIL TEMPLATE USAGE

CROSS REFERENCE TO RELATED APPLICATIONS

The present application is a continuation of U.S. patent application Ser. No. 17/317,548, titled "Systems and Methods for Monitoring Email Template Usage," which was filed on May 11, 2021, and which claims benefit of and priority to U.S. Provisional Patent Application Ser. No. 63/045,607, titled "Systems and Methods for Monitoring Email Template Usage," which was filed on Jun. 29, 2020, both of which are herein incorporated by reference in their entireties for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be noted that these statements are to be read in this light, and not as admissions of prior art.

Electronic mail (email) is a popular way for groups of individuals and/or organizations to communicate information with one another. For example, an email may include imagery, such as text, an image, an interface, and so forth, to convey the information. Indeed, a sender may incorporate such information into an email to send to a recipient, and the recipient may view the information included in the email to respond accordingly, such as to provide information back to the sender. Further, a sender may have different email templates (e.g., graphic backgrounds, image-based headers, graphic watermarks) readily available to be able to quickly create and send multiple emails. As an example, the sender may select and use one of the email templates as a basis for emails of a common type and/or to be sent for a similar purpose, such as for sending to a particular group of recipients, for transmitting similar information to recipients, for collecting similar information from recipients, and so forth. An email template may include images, formatting, symbols, and the like that can be used to convey authenticity. For example, an email template may include a header, side panels, a footer, and/or a background with imagery (e.g., company logos) that conveys authenticity to a recipient.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
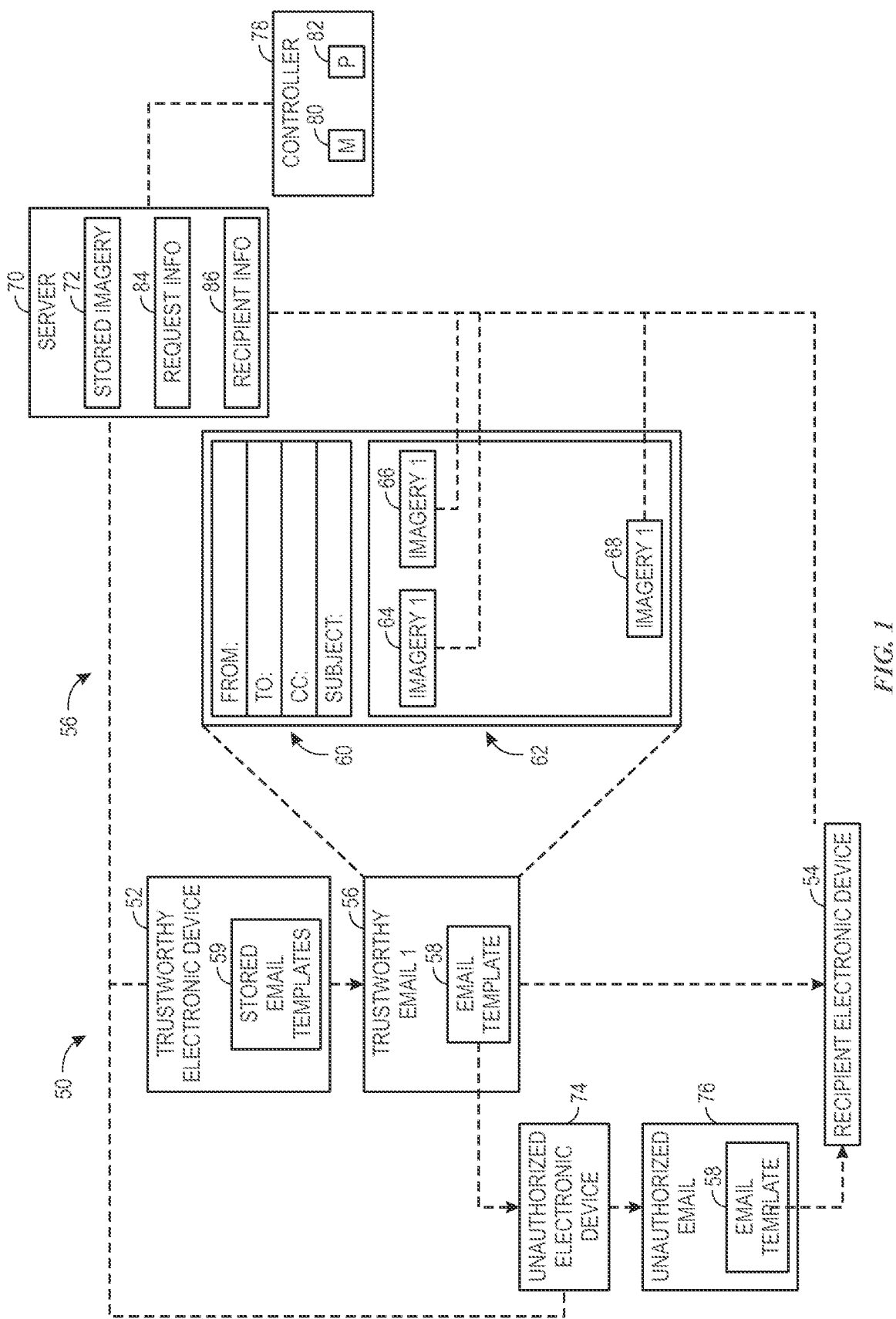
FIG. 1 is a schematic diagram of an embodiment of a communication system in which a trustworthy electronic device may be configured to send an email, which incorporates an email template, to a recipient electronic device, in accordance with an aspect of the present disclosure.

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

It is now recognized that, in some circumstances, an unauthorized entity may use an email template (e.g., a graphic header with a corporate logo) in a manner that was not intended by the template owner or developer (e.g., a company that uses the template for emails as a way of identifying and distinguishing itself). Indeed, the unauthorized entity may employ the email template to enhance a phishing operation by creating an impression of authenticity in recipients. As an example, the unauthorized entity may copy one of the email templates (e.g., header imagery) employed or created by the template owner to send to various recipients to collect confidential information in responses that would typically be transmitted to the template owner. As a result, recipients that respond to the email, thinking the email came from the template owner (e.g., based on assumed authenticity supported by the email template), may unintentionally and undesirably send information (e.g., confidential information) to the unauthorized entity. As used herein, a response to an email refers to any suitable digital interaction with the sent email, such as sending a response email to the sender of the sent email, interacting with a link or other content presented by the sent email, following an instruction provided in the sent email, and the like.

Present embodiments are generally directed toward systems and methods to monitor information associated with usages of email templates. A trustworthy sender, such as an individual, an organization, an enterprise, and the like, may use an email template as a basis for sending multiple emails having the same or a similar format. By way of example, emails associated with the same email template may include a shared or common set of imagery, such as a common image, a common set of text, and so forth. Indeed, the sender may make slight modifications to the email template, such as based on a particular intended recipient, for incorporation into an email. For instance, the sender may modify the email template to add a recipient's name, contact, or other associated information to personalize the email. The term email template may encompass a variety of template types having various imagery. As used herein, imagery may generally refer to any variety of objects, elements, and/or features that are displayed on a device upon opening or downloading an email having an email template. Such imagery may include graphics, watermarks, fixed text, modifiable text, text entry space, embedded imagery, image headers, logos, image side panels, image footers, background imagery, and the like. Such imagery may also be fixed or dynamic. Fixed imagery may be transferrable, unchanging graphics, while dynamic imagery may include links or instructions for obtaining and presenting imagery from a remote storage (e.g., a server). Dynamic imagery may be modified between submission in an email and receipt of the email based on how the server responds to a request for presentation at each stage. In some embodiments, imagery may include a single pixel, such as a dynamic pixel that is obtained from storage, such as a server. By coordinating presentation of the pixel, information related to an email incorporating the pixel (e.g., incorporating an email template that includes the pixel) can be obtained by the server or related control systems, as will be discussed in further detail below.

As an example, the template owner or valid sender may use an email template to create an email that requests a recipient to provide information, such as personal, confidential, or sensitive information, to the valid sender in response to the email. However, in some circumstances, an unauthorized entity (e.g., a fraudulent entity) may obtain such an email and copy imagery of the email template created by the valid sender in order to use the imagery for a phishing operation in which the unauthorized entity requests information from recipients. For instance, the unauthorized entity may copy the imagery of the email template to create an email that disguises the unauthorized entity as the valid sender to convince the recipient to provide information to the unauthorized entity. That is, the email sent by the unauthorized entity may include the same or similar images, text, and/or other imagery as that of the email template created by the valid sender. By responding to the email sent by the unauthorized entity, the recipient may unintentionally provide information to the unauthorized entity instead of to the valid sender.

Thus, it is presently recognized that determining when imagery of an email template may have been used by an unauthorized entity may enable further actions to be taken to mitigate the effects of the unauthorized usage of the email template, such as by blocking a recipient from providing information to the unauthorized entity. Accordingly, embodiments of the present disclosure are related to monitoring information associated with usage of an email template. For example, the imagery of the email template (e.g., dynamic imagery) may include a software script, coding, or another embedded element that is linked to a server (e.g., a server associated with the valid sender). When an email having the imagery (e.g., including a marketing pixel) is opened and/or downloaded, the software script associated with the imagery may cause a request to be transmitted to the server to retrieve data (e.g., graphics for display) from the server for usage in the email, such as to display an image on an electronic or computing device on which the email is opened. For instance, the server may receive a request when a recipient opens a received email that incorporates the imagery and/or when an unauthorized entity is sending an email that incorporates the imagery. A monitoring system (e.g., a control system) may monitor such requests received by the server. Throughout the present disclosure, communications and monitoring may be based on such coordination with the imagery. For example, code (e.g., a marketing pixel or dynamic pixel) associated with imagery may initiate communication and associated transfer of information when imagery is accessed via email. Specifically, for example, the code may cause communication with a specific server to obtain input for presentation of imagery in an email that is being accessed. The requested input may directly relate to a display function for the imagery (e.g., a request for graphics), the requested input may be integrated with the display function, or the requested input may at least appear to be related to the display function. This may be done so that potential exploiters cannot easily remove or even identify the code. Such code can be relatively limited in size and capable of being disguised such that the code can be incorporated in a way that gets copied with the imagery.

For example, the request may include various information, such as a geographic location from where the request was transmitted (e.g., indicative of a location of the device transmitting the request), a time when the request was transmitted, an identifier or type of the electronic device transmitting the request, and the like. The monitoring system may determine whether such information associated with the request pertaining to the imagery matches with expected information associated with the request pertaining to the imagery. If the monitoring system determines that the information does not match with the expected information, the monitoring system may determine that there is unauthorized (e.g., suspicious, undesirable) usage of the imagery and/or of the email template associated with the imagery. Thus, the monitoring system may perform a subsequent action to mitigate the effects of such usage, such as by modifying the data that is retrieved from the server via the request and/or informing the recipients of the unauthorized usage of the email template (e.g., to block recipients from communicating with unauthorized entities). In this manner, the monitoring system may monitor information associated with the requests received by the server in order to ensure recipients communicate with a trustworthy sender and not with an unauthorized entity.

With the preceding in mind, FIG. 1 is a schematic diagram of an embodiment of a communication system 50 (e.g., the internet) in which a trustworthy electronic device 52 may be communicatively coupled to a recipient electronic device 54. As described herein, an electronic device refers to any suitable component that may transmit or receive a communication signal. For instance, the electronic device may include a processor, a desktop computer, a laptop computer, a mobile phone, a tablet, another suitable electronic device, or any combination thereof. As an example, a user may utilize an interface (e.g., a touch screen, a button) of an electronic device to send and/or view a message or another form of communication via a user input. As another example, an electronic device may be programmed to send a message or another form of communication automatically (e.g., without a user input). In some embodiments, the trustworthy electronic device 52 may be a part of an enterprise system, and the recipient electronic device 54 may be a client device, customer device, or member device of the enterprise system. By way of example, the trustworthy electronic device 52 may communicate with the recipient electronic device 54 to provide a client with certain information and/or to request the client to provide certain information via the recipient electronic device 54. Similarly, the recipient electronic device 54 may communicate with the trustworthy electronic device 52 to request information from the enterprise system, respond to communications sent by the enterprise system, and so forth.

In the illustrated embodiment, the trustworthy electronic device 52 and the recipient electronic device 54 may be able to exchange emails with one another. For example, the trustworthy electronic device 52 may be configured to send a first trustworthy email 56 to the recipient electronic device 54. The first trustworthy email 56 may include an email template 58, which may include various imagery used as a basis for sending the first trustworthy email 56. For instance, the trustworthy electronic device 52 may have access to and/or may store multiple email templates 59 that are each configured to be used as a basis for creating a respective email. In an example, a first email template of the email templates 59 may be used to request a first set of information from a first user. That is, a first email may incorporate imagery of the first email template along with additional imagery, such as to personalize the first email, to facilitate provision of the first set of information by the first user (e.g., a recipient) via response from the recipient electronic device 54 of the first user. A second email, which may be sent to a second user, may also incorporate imagery of the first email template along with different additional imagery to personalize the second email to facilitate provision of the first set of information by the second user (e.g., a recipient) via response from the recipient electronic device 54 of the second user. Accordingly, the first email template may facilitate creating multiple emails more quickly to request the first set of information from different users. In another example, a second email template of the email templates 59 may be used to provide a second set of information to the first user and/or the second user. Thus, emails may incorporate imagery of the second email template and additional respective imagery to facilitate creating multiple, personalized emails more quickly in order to provide the second set of information to different users. In this way, the trustworthy electronic device 52 may use any of the email templates 59 to create multiple emails more quickly (e.g., without having to separately and individually generate new imagery for each email).

Each email template may include shared or common imagery, including an image, a graphic, an icon, a symbol, and/or text. That is, the email template 58 of the first trustworthy email 56 may include certain imagery that are also used in other emails that incorporate the email template 58. The first trustworthy email 56 may also include other imagery (e.g., an additional image, an additional graphic, an additional icon, an additional symbol, and/or additional text) that is not used in other emails incorporating the email template 58. In the illustrated example, the first trustworthy email 56 includes a header 60, which may include subject and routing information. The first trustworthy email 56 may also include a body 62 having message information of the first trustworthy email 56. For instance, the body 62 may include a first imagery 64 (e.g., a first image), a second imagery 66 (e.g., a second image), and/or a third imagery 68 (e.g., a third image). In some embodiments, the first imagery 64, the second imagery 66, and/or the third imagery 68 may be a part of the email template 58. That is, the first imagery 64, the second imagery 66, and/or the third imagery 68 may also be used in other emails that incorporate the email template 58. The first trustworthy email 56 may also include other imagery, such as additional images and/or text that may be included in the body 62, that are not used in other emails incorporating the email template 58. In other words, each email incorporating the email template 58 may include the same first imagery 64, the same second imagery 66, and/or the same third imagery 68 (e.g., positioned at approximately the same respective locations within a body of the email) along with a different set of imagery. In additional or alternative embodiments, other imagery, such as certain text within the header 60 and/or within the body 62, may also be a part of the email template 58.

In some implementations, the first imagery 64, the second imagery 66, and/or the third imagery 68 may be retrieved from a server 70, which may be associated with the trustworthy electronic device 52. That is, the email template 58 may include digital structure that is linked to the server 70. As used herein, the digital structure refers to any computing aspect of the email template 58, such as executable code or a data file (e.g., a computing file), and the digital structure may be used to retrieve information stored on the server 70. For instance, the server 70 may store various stored imagery 72 that may be retrieved for incorporation into the first trustworthy email 56. In other words, the digital structure may send a request to the server 70 for the first imagery 64, the second imagery 66, and/or the third imagery 68, and the server 70 may provide a corresponding stored imagery 72 based on the request in order to enable the first imagery 64, the second imagery 66, and/or the third imagery 68 to be displayed in the first trustworthy email 56. As an example, when the trustworthy electronic device 52 opens the email template 58 to create the first trustworthy email 56 to be sent to the recipient electronic device 54, the digital structure of the email template 58 may communicate with the server 70 to retrieve the first imagery 64, the second imagery 66, and/or the third imagery 68 for download and display on the trustworthy electronic device 52. Further, when the recipient electronic device 54 receives and opens or downloads the first trustworthy email 56 and the email template 58 of the first trustworthy email 56, the digital structure of the email template 58 may communicate with the server 70 to retrieve the first imagery 64, the second imagery 66, and/or the third imagery 68 for display on the recipient electronic device 54. Indeed, the server 70 may receive a request for the first imagery 64, the second imagery 66, and/or the third imagery 68 each time an email using the email template 58 is opened and/or downloaded.

In some circumstances, an unauthorized electronic device 74 may copy imagery from the email template 58 for incorporation into an unauthorized email 76. By way of example, the trustworthy electronic device 52 may use the first trustworthy email 56 to request information from the user of the recipient electronic device 54. The unauthorized electronic device 74 may copy the first trustworthy email 56 to try to request the same information from the user of the recipient electronic device 54. For instance, the unauthorized electronic device 74 may incorporate the email template 58 (e.g., the first imagery 64, the second imagery 66, and/or the third imagery 68) to disguise the unauthorized email 76 as the first trustworthy email 56 in order to convince the user of the recipient electronic device 54 to send information to the unauthorized electronic device 74. In other words, the unauthorized electronic device 74 may try to replicate the first trustworthy email 56 to convince the user of the recipient electronic device 54 that the unauthorized electronic device 74 is the trustworthy electronic device 52, and the user of the recipient electronic device 54 may therefore provide information to the unauthorized electronic device 74 with an original intent of providing information to the trustworthy electronic device 52.

For this reason, a controller or a control system 78 (e.g., an automation controller, an electronic controller) that is communicatively coupled to the server 70 may be used to monitor requests transmitted to the server 70 in order to determine whether the email template 58 (e.g., the first imagery 64, the second imagery 66, the third imagery 68) is being used in the first trustworthy email 56 or in the unauthorized email 76. The controller 78 may include a memory 80 and/or processing circuitry 82, such as a microprocessor. The memory 80 may include volatile memory, such as random-access memory (RAM), and/or non-volatile memory, such as read-only memory (ROM), optical drives, hard disc drives, solid-state drives, or any other non-transitory computer-readable medium that includes instructions executable by the processing circuitry 82. The processing circuitry 82 may include one or more application specific integrated circuits (ASICs), one or more field programmable gate arrays (FPGAs), one or more general purpose processors, or any combination thereof, configured to execute the instructions stored in the memory 80, such as to determine whether information associated with a request transmitted to the server 70 is indicative of the email template 58 being incorporated in the unauthorized email 76.

In some implementations, the controller 78 may be configured to determine information associated with requests transmitted to the server 70. As an example, based on software coding used to transmit the request to the server 70, the request may include various information associated with the imagery of the email template 58 corresponding to the request, including a geographic location of the electronic device opening the email template 58, a time in which the request was received by the server 70 to indicate when the email template 58 was opened, an identifier of the electronic device opening the email template 58, an application or email client used to open the imagery of the email template 58, a language setting of the application or email client used to open the imagery of the email template 58, other suitable information associated with the imagery, or any combination thereof. The controller 78 may compare such information with expected information associated with the request to determine whether the imagery, and therefore the email template 58, is being incorporated in the first trustworthy email 56 or is being incorporated in the unauthorized email 76. For example, the server 70 may store expected request information 84 (e.g., a source address) associated with requests related to respective imagery (e.g., respective stored imagery 72) and indicative of the first trustworthy email 56 incorporating the email template 58. The controller 78 may compare monitored information with the expected request information 84 stored on the server 70 to determine whether the email template 58 is being used in the unauthorized email 76 (e.g., based on a mismatch between the monitored information and the expected request information 84).

To this end, in certain embodiments, each request may also include identifier data that is attributed or identifiable to a specific one of the stored imagery 72. By way of example, each imagery may include a globally unique identifier (GUID) that is referred to in the email template 58, such as in the request sent to the server 70. That is, the controller 78 may identify the imagery pertaining to a transmitted request based on the GUID included in the request. Additionally, the GUID may be used to associate the expected request information 84 stored on the server 70 with a corresponding imagery. The controller 78 may therefore use the GUID included in the request (e.g., included in a portion of the monitored information) to identify a specific imagery associated with the request. Based on the GUID, the controller 78 may further refer to the corresponding expected request information 84 stored on the server 70 and associated with the specific imagery for comparison with monitored information (e.g., an additional portion of the monitored information) associated with the request.

In some embodiments, the controller 78 may determine that the trustworthy electronic device 52 is incorporating the email template 58 in the first trustworthy email 56 in response to a determination that the information associated with the request matches with the expected request information 84. For instance, the controller 78 may determine that the information associated with the request may be within a threshold (e.g., a threshold range, a threshold value) of the expected request information 84 to determine that the email template 58 is incorporated in the first trustworthy email 56. Further, the controller 78 may determine that the unauthorized electronic device 74 is using the email template 58 in the unauthorized email 76 in response to a determination that the information associated with the request does not match with the expected request information 84. That is, the controller 78 may determine that the email template 58 is incorporated in the unauthorized email 76 (which is representative of any unauthorized communication) based on a determination that the information associated with the request is not within a threshold of the expected request information 84.

Additionally or alternatively, the controller 78 may determine which recipient electronic device 54 has opened and/or downloaded imagery of the email template 58. By way of example, the server 70 may also store expected recipient information 86 (e.g., associated with the recipient electronic device 54), such as an expected geographic location of the recipient electronic device 54, an identifier of the recipient electronic device 54, a type of the recipient electronic device 54, and the like, and the controller 78 may compare the information associated with the request with the expected recipient information 86. Indeed, the controller 78 may determine a specific recipient electronic device 54 that has opened and/or downloaded the email template 58 based on a determination that the geographic location associated with the request matches with the expected geographic location associated with the recipient electronic device 54, that an identifier of the electronic device indicated by the request matches with the stored identifier associated with the recipient electronic device 54, and/or that a type of the electronic device indicated by the request matches with the stored type associated with the recipient electronic device 54. Further, the controller 78 may use the information associated with the request to identify which recipient electronic device 54 may have been affected by the unauthorized email 76. By way of example, after determining that the email template 58 was incorporated in the unauthorized email 76, the controller 78 may then identify which specific recipient electronic device 54 may have opened and/or downloaded the unauthorized email 76 based on comparing the information associated with the request (e.g., information associated with the recipient electronic device 54) with the expected recipient information 86. The controller 78 may then perform an action based on the identification of the specific recipient electronic device 54, such as an action blocking or discouraging the user of the specific recipient electronic device 54 from undesirably interacting with the unauthorized email 76.

Figure 2:
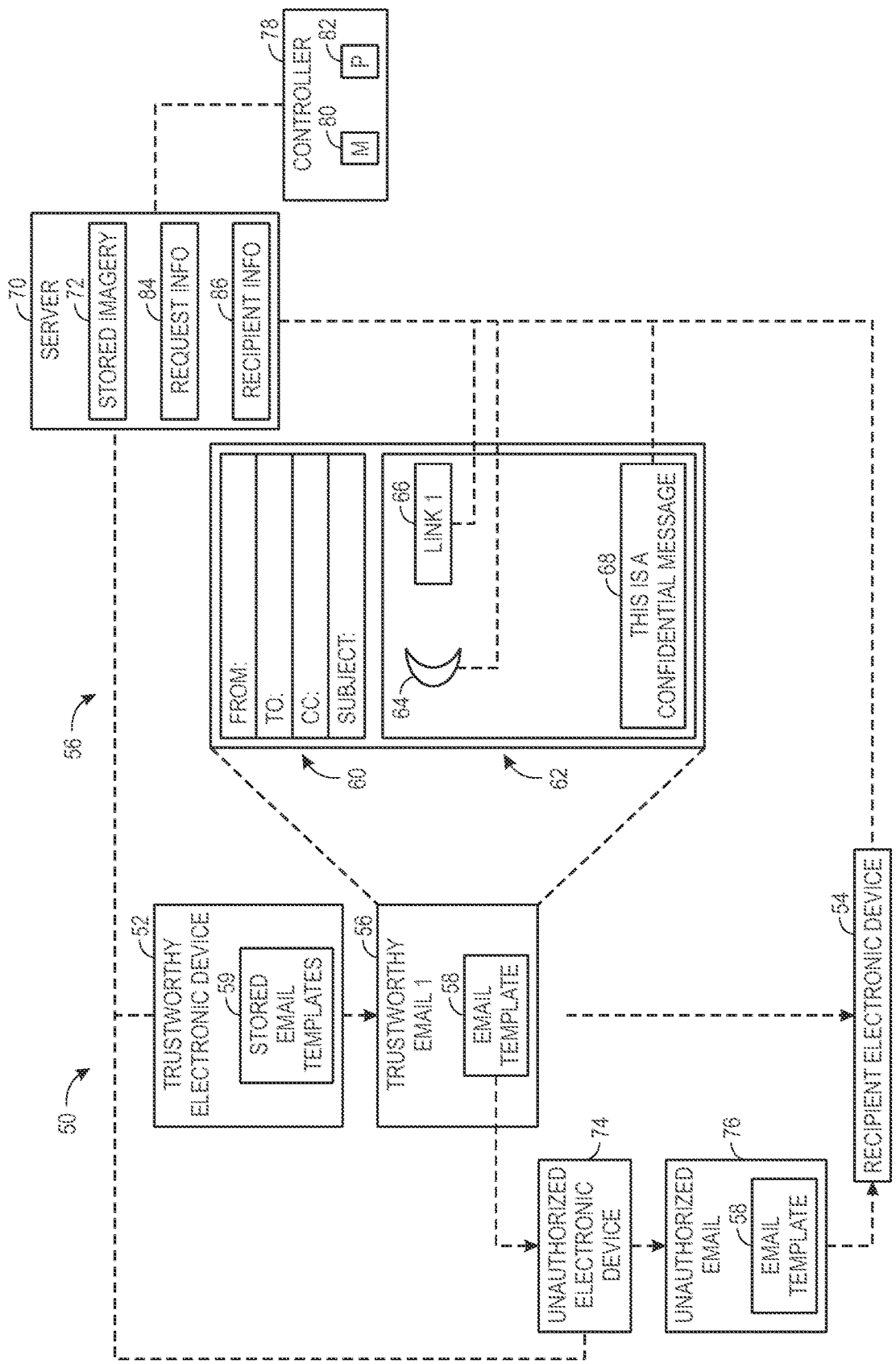
FIG. 2 is a schematic diagram of an embodiment of the communication system of FIG. 1 illustrating possible imagery of the email template, in accordance with an aspect of the present disclosure.

FIG. 2 is a schematic diagram of an embodiment of the communication system 50 further illustrating the first trustworthy email 56. In the illustrated embodiment, the first imagery 64 may include a graphic or an image, which may represent a logo of the enterprise system associated with the trustworthy electronic device 52. In this way, the first imagery 64 may be an identifier to indicate the source from which the first trustworthy email 56 originates. Indeed, the first imagery 64 may convince the user that the email containing the email template 58 is from the enterprise system and not from an unauthorized entity (e.g., associated with the unauthorized electronic device 74). In addition, the illustrated second imagery 66 may include a link. For instance, the user may interact with (e.g., select) the second imagery 66 to navigate to another interface, such as to open another application or window, which may be associated with the enterprise system (e.g., the trustworthy electronic device 52). As an example, the interface initiated by the second imagery 66 may enable the user to send information requested by the email template 58. In this way, the enterprise system may receive the requested information via user interaction with the second imagery 66. Further, the illustrated third imagery 68 may include a textbox indicating that the first trustworthy email 56 incorporating the email template 58 contains a confidential message. The textbox may further convince the user that the first trustworthy email 56 incorporating the email template 58 was sent from the trustworthy electronic device 52. In this manner, the first imagery 64, the second imagery 66, and the third imagery 68 may cooperatively influence the user to provide requested information or otherwise interacting with the first trustworthy email 56 in a desirable manner.

However, the unauthorized electronic device 74 may attempt to incorporate the same imagery 64, 66, 68 and/or similar imagery into the unauthorized email 76 to influence the user to provide information to the unauthorized electronic device 74. By way of example, the unauthorized electronic device 74 may attempt to use the first imagery 64 and/or the third imagery 68 to convince the user of the recipient electronic device 54 that the unauthorized email 76 is from the enterprise system associated with the trustworthy electronic device 52. Further, in some cases, the unauthorized electronic device 74 may replace the second imagery 66 with an alternative imagery, such as a different link, that initiates another interface, which may be associated with the unauthorized electronic device 74 and not with the enterprise system (e.g., the trustworthy electronic device 52). The interface initiated by the alternative imagery may enable the user of the recipient electronic device 54 to provide information to the unauthorized electronic device 74 instead of to the trustworthy electronic device 52. In this way, the unauthorized electronic device 74 may attempt to use the first imagery 64 and the third imagery 68 to convince the user to utilize the alternative imagery in order to provide information to the unauthorized electronic device 74 via the unauthorized email 76. However, present embodiments and techniques may identify these attempted uses based on attempts to access the server 70. Although the illustrated email template 58 contains three imagery 64, 66, 68 that include a respective image, link, or textbox retrieved from the server 70, additional or alternative email templates 58 may include any suitable number of imagery 64, 66, 68, and/or the imagery 64, 66, 68 may include another object or element retrieved from the server 70 (e.g., from the stored imagery 72), such as a pixel element, an icon, a symbol, a text string, and so forth.

Figure 3:
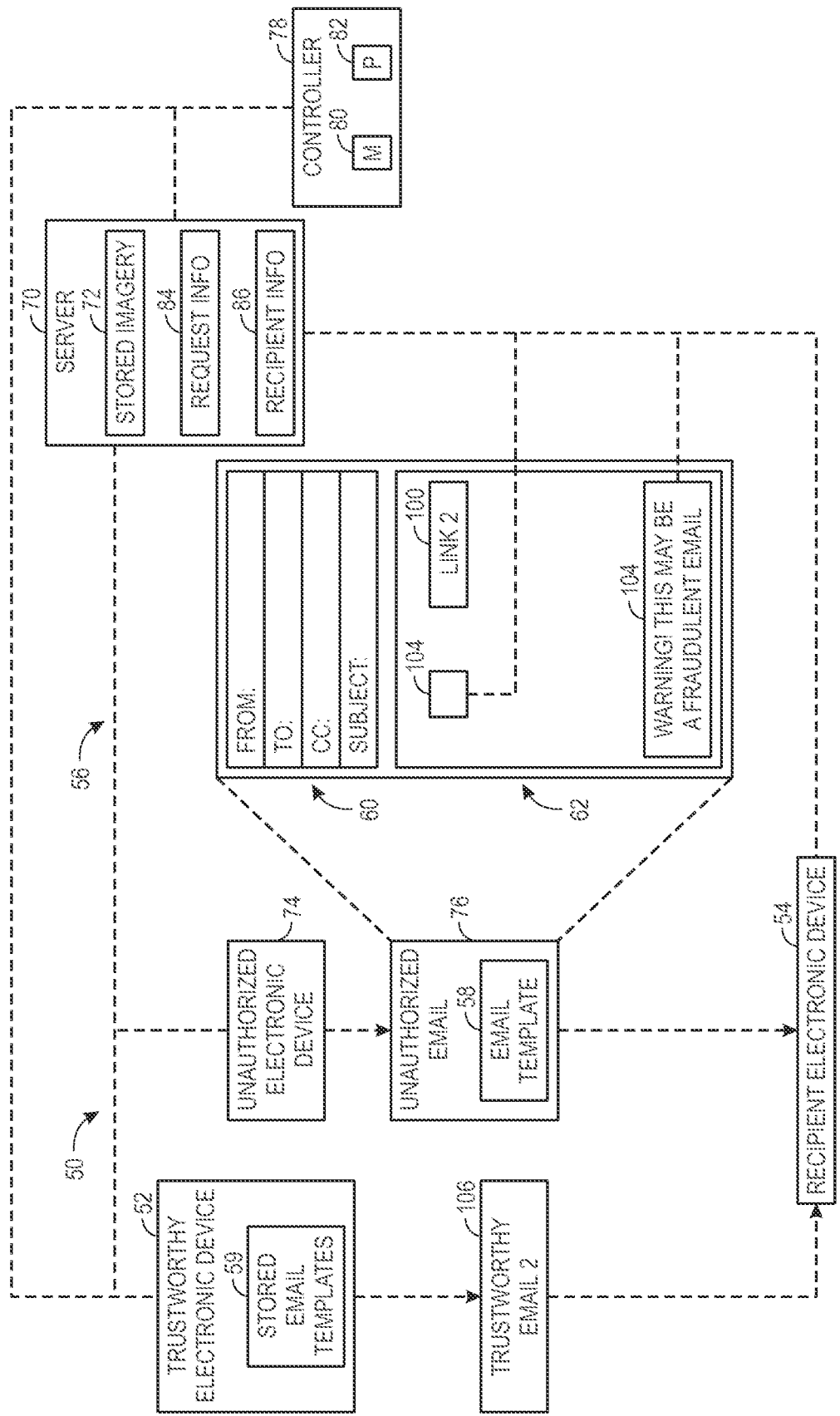
FIG. 3 is a schematic diagram of an embodiment of a communication system in which a controller has determined that an unauthorized electronic device is sending an email, which incorporates an email template, to a recipient electronic device, in accordance with an aspect of the present disclosure.

FIG. 3 is a schematic diagram of an embodiment of the communication system 50 in which the controller 78 has determined that the unauthorized electronic device 74 is incorporating the email template 58 in the unauthorized email 76. In one example, the email template 58 incorporated in the unauthorized email 76 has been modified to replace the second imagery 66 with an alternative imagery 100 (e.g., a link to a website), which may be employed to cause the user to provide information to the unauthorized electronic device 74 instead of to the trustworthy electronic device 52. The controller 78 may determine that the email template 58 no longer contains the second imagery 66 based on information associated with requests transmitted when opening the email template 58 incorporated in the unauthorized email 76. For instance, the controller 78 may determine that opening and/or downloading the unauthorized email 76 incorporating the email template 58 causes requests to be transmitted to the server 70 to retrieve the first imagery 64 and the third imagery 68, but not to retrieve the second imagery 66, as expected when opening and/or downloading the first trustworthy email 56 incorporating the email template 58. In an additional or an alternative example, the controller 78 may determine that a geographic location of the electronic device (e.g., of the unauthorized electronic device 74) opening the email template 58 incorporated in the unauthorized email 76 does not match with an expected geographic location of an electronic device (e.g., of the recipient electronic device 54) opening the email template 58 incorporated in the first trustworthy email 56. In a further example, the controller 78 may determine that an identifier of the electronic device (e.g., of the unauthorized electronic device 74) opening the email template 58 incorporated in the unauthorized email 76 does not match an expected identifier of an electronic device (e.g., of the recipient electronic device 54) opening the email template 58 incorporated in the first trustworthy email 56. Additional details and examples regarding comparing monitored information with expected request information 84 are further described below with respect to FIG. 4. The controller 78 may determine that the unauthorized electronic device 74 is incorporating the email template 58 in the unauthorized email 76 based on a determination of a mismatch between information associated with the request and expected request information 84.

In response to a determination that the email template 58 is incorporated in the unauthorized email 76, the controller 78 may perform an action to mitigate the effects of the email template 58 in the unauthorized email 76. In some embodiments, the controller 78 may dynamically adjust any of the imagery 64, 66, 68 of the email template 58. That is, each of the imagery 64, 66, 68 may be dynamic imagery. For example, the controller 78 may adjust the stored imagery 72 within the server 70 such that, when a request is transmitted to the server 70 via the email template 58, an adjusted imagery that is different from any of the imagery 64, 66, 68 is retrieved. In the illustrated example, the controller 78 may modify the stored imagery 72 such that a fourth imagery 102 may be retrieved instead of the first imagery 64 when the email template 58 is in use (e.g., when the unauthorized email 76 is downloaded or opened). The fourth imagery 102 may, for instance, include an image indicating that the unauthorized email 76 containing the email template 58 was not sent by the trustworthy electronic device 52. Indeed, the fourth imagery 102 may include an image, such as a warning or caution image, that is not the logo of the enterprise system to flag the attention of the user of the recipient electronic device 54. Additionally or alternatively, the controller 78 may modify the stored imagery 72 such that a fifth imagery 104 may be retrieved instead of the third imagery 68. The fifth imagery 104 may also indicate that the unauthorized email 76 containing the email template 58 was not sent by the trustworthy electronic device 52. In the illustrated embodiment, the fifth imagery 104 includes a textbox indicating that the email (e.g., the unauthorized email 76) containing the email template 58 may be a fraudulent email. In this manner, the fourth imagery 102 and/or the fifth imagery 104 may influence the user of the recipient electronic device 54 not to provide information using the unauthorized email 76, such as via the alternative imagery 100.

In additional or alternative embodiments, the controller 78 may be communicatively coupled to the trustworthy electronic device 52 and may cause the trustworthy electronic device 52 to send a second trustworthy email 106 (e.g., that does not include the email template 58) to the recipient electronic device 54 in response to determining that the unauthorized email 76 incorporates the email template 58. The second trustworthy email 106 may inform the user of the recipient electronic device 54 that the unauthorized email 76 was not sent from enterprise system (e.g., the trustworthy electronic device 52) and therefore, the user should not provide information via the unauthorized email 76. In further embodiments, the controller 78 may flag the email template 58 for further review in response to determining that the unauthorized email 76 incorporates the email template 58. As an example, flagging the email template 58 may indicate that further examination of the email template 58 is to be performed in order to confirm that the unauthorized email 76 incorporates the email template 58. As another example, flagging the email template 58 may cause the email template 58 to be examined to determine how and/or why the particular email template 58 is being incorporated into the unauthorized email 76 (e.g., how the unauthorized electronic device 74 received the email template 58) so as to avoid other email templates from being incorporated into other unauthorized emails. Thus, the controller 78 may perform an action that may block a user from interacting with the unauthorized email 76 and/or may block a subsequent usage of another email template in an unauthorized email.

Figure 4:
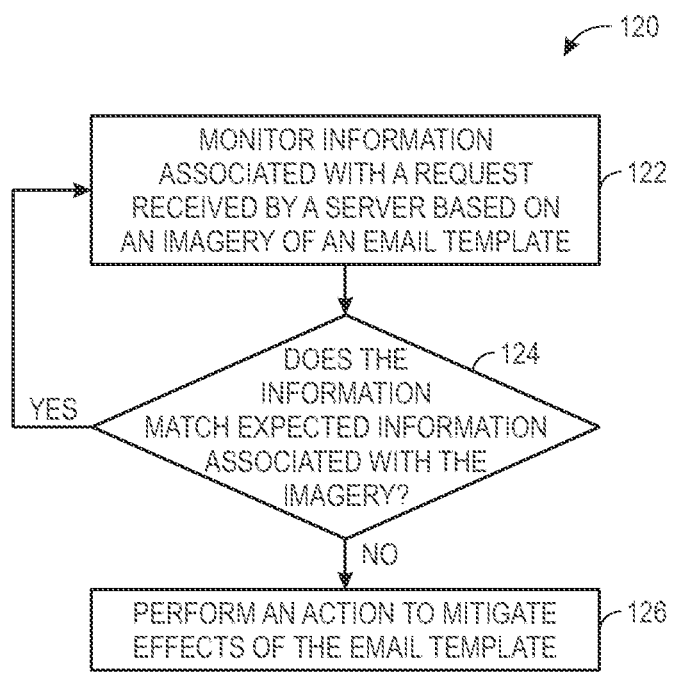
FIG. 4 is a flowchart of an embodiment of a method or process for performing an action based on monitoring information related to a request received by a server in association with an imagery from an email template, in accordance with an aspect of the present disclosure.

FIG. 4 is a flowchart of an embodiment of a method or process 120 for performing an action based on information associated with a request received by a server (e.g., the server 70). As an example, the steps of the method 120 may be performed by one or more control systems, such as the controller 78 (e.g., the processing circuitry 82). It should be noted that the steps of the method 120 may be performed differently in additional or alternative embodiments. For instance, additional steps may be performed, and/or certain steps of the depicted method 120 may be modified, removed, and/or performed in a different order.

At block 122, information associated with a request received by the server is monitored. In particular, the request is sent based on an imagery of an email template, such as to retrieve a corresponding imagery, object, or element stored on the server for display on an electronic device. For instance, the request may be sent in response to the electronic device opening and/or downloading the imagery of the email template.

At block 124, the monitored information is compared with expected information, which may be stored on the server, in order to determine whether the monitored information matches with the expected information. Such comparison may be used to determine whether the imagery, and therefore the email template, is being incorporated in a trustworthy email and/or in an unauthorized email. In particular, a determination may be made that the email template is being incorporated in an unauthorized email based on a mismatch between the monitored information and the expected information.

In some embodiments, the monitored information may include a geographic location of an electronic device sending the request to the server. Thus, a mismatch between a monitored geographic location of the electronic device and an expected geographic location of the electronic device may indicate that the email template is being incorporated in an unauthorized email. For example, a trustworthy electronic device may intend to send a trustworthy email incorporating the email template to users located in a first region. However, a determination may be made that an electronic device in a second region that is outside of the first region (e.g., outside of a threshold distance of the first region) may be transmitting a request to the server. Such a determination may indicate that an unauthorized electronic device located in the second region has copied the email template for incorporation in an unauthorized email and/or an unauthorized electronic device is sending an unauthorized email that incorporates the email template to users located in the second region. Thus, a determination may be made that the email template is being incorporated in an unauthorized email based on a mismatch between a monitored geographic location associated with a request and an expected geographic location associated with the request.

Additionally or alternatively, the monitored information may include a time in which a request is received by the server. For instance, for an email template having multiple imagery, each time the email template is opened and/or downloaded, respective requests associated with each of the imagery may be sent to the server at approximately the same time (e.g., within a threshold time interval). That is, opening and/or downloading an email that incorporates an entirety of the email template may cause a particular set of requests (e.g., requests associated with specific imagery) to be sent to the server approximately simultaneously. However, if an unauthorized electronic device has modified the email template, such as to remove one of the imagery and/or to replace one of the imagery of the email template (e.g., with an alternative imagery that does not cause a request to be sent to the server upon opening and/or downloading), and has incorporated the modified email template into an unauthorized email, a different set of requests may be received by the server upon opening and/or downloading the unauthorized email. By way of example, a first request to retrieve a first imagery may be received by the server, but an expected second request to retrieve a second imagery may not be received by the server within a threshold period of time. For this reason, a determination may be made that the email template is being incorporated in an unauthorized email based on a mismatch between a set of requests received by the server within a threshold period of time and an expected set of requests to be received by the server in the threshold period of time. Additionally or alternatively, opening and/or downloading an email that incorporates the email template may cause a single request for a specific set of imagery to be sent to the server. Therefore, a determination may be made that the email template is being incorporated in an unauthorized email based on a mismatch between a set of imagery being requested within a threshold period of time and an expected set of imagery to be requested in the threshold period of time.

As another example, a trustworthy electronic device may send a trustworthy email incorporating the email template with a specific time stamp. Thus, recipient electronic devices opening and/or downloading imagery of the email template of the trustworthy email may cause requests to be transmitted to the server within a threshold period of time (e.g., before an expected time stamp) relative to the specific time stamp. However, an unauthorized electronic device may send an unauthorized email incorporating the email template at a substantially different time (e.g., after the threshold period of time relative to the specific time stamp) because the unauthorized email is attempting to provide copied imagery. As such, recipient electronic devices opening and/or downloading imagery of the email template of the unauthorized email may cause requests to be transmitted to the server with time stamps indicative of times that are beyond the threshold period of time relative to the specific time stamp. Therefore, a determination may be made that the email template is being incorporated in an unauthorized email based on a mismatch between a monitored time stamp associated with a request and an expected time stamp associated with the request (e.g., the difference between the monitored time stamp and the expected time stamp is greater than an expected threshold period of time, the monitored time stamp is outside of an expected range of time stamps).

Furthermore, the monitored information may include an identifier associated with the electronic device used to open and/or download the imagery of the email template. By way of example, the identifier may indicate an assigned coding of the electronic device, the type of the electronic device (e.g., a mobile phone or a laptop computer), a manufacturer of the electronic device, an Internet Protocol address associated with the electronic device, an application (e.g., a web browser, an email client, a viewer) being used, and/or another identifier. The trustworthy electronic device may intend to send a trustworthy email that incorporates the email template to a specific group of users having electronic devices associated with certain respective, expected identifiers. An unauthorized electronic device, which may use the email template, may not have an expected identifier and/or may send the unauthorized email incorporating the email template to users who utilize electronic devices that do not have an expected identifier. Therefore, a determination may be made that the email template is being incorporated in an unauthorized email based on a mismatch between a monitored identifier associated with a request and an expected identifier associated with the request.

In another example, the information may include a total number of requests made to the server indicative of a total number of users and/or recipient electronic devices opening and/or downloading the imagery of the email template. For instance, the trustworthy electronic device may intend to send a trustworthy email incorporating the email template to a limited total number of users and may therefore expect a limited number of requests (e.g., below a threshold number of requests) to be received by the server based on the limited number of users opening and/or downloading the imagery of the email template. However, an unauthorized electronic device sending an unauthorized email incorporating the email template may increase the number of users receiving, opening, and/or downloading the imagery of the email template and therefore increase the number of requests made to the server. Thus, a determination may be made that the email template is being incorporated in an unauthorized email based on a monitored number of requests received by the server exceeding a threshold number of requests.

Further still, the information may include other settings or characteristics associated with the electronic device. As an example, the information may include a language setting of an application (e.g., a web browser, an email client, a viewer) being used to open and/or download the imagery of the email template. That is, the trustworthy electronic device may send a trustworthy email incorporating the email template to electronic devices utilizing an application having a specific language setting, whereas the unauthorized electronic device may send an unauthorized email incorporating the email template to electronic devices utilizing an application with a different language setting. Thus, a determination may be made that the email template is being incorporated in an unauthorized email based on a mismatch between a monitored language setting (e.g., Russian) and an expected language setting (e.g., English). Indeed, any suitable mismatch between monitored information and expected information may indicate that the email template is being incorporated in an unauthorized email.

In further embodiments, multiple criteria may be used to determine whether the email template is being incorporated in an unauthorized email. Using multiple criteria may avoid occurrences in which the email template has been incorrectly determined as being incorporated in an unauthorized email. In other words, multiple criteria may be used in order to more accurately determine whether the email template is being incorporated in an unauthorized email. For instance, an intended user may have moved or is on vacation and is therefore not currently located in the expected geographic location stored on the server. As such, when the user utilizes their recipient electronic device to open and/or download a trustworthy email incorporating the email template, the geographic location associated with a corresponding request may not match with the expected geographic location, even though the user did not open and/or download an unauthorized email incorporating the email template. As another example, an intended user may have partially opened and/or downloaded an email (e.g., due to poor connection with internet services, a power outage) having the email template such that the server successfully receives a request associated with a first imagery of the email template but does not successfully receive a request associated with a second imagery of the email template. Thus, the server may not have received an expected number of requests within a threshold period of time, even though the user did not open and/or download an unauthorized email incorporating the email template. However, a combination of a mismatch between geographic locations and also a mismatch between a number of requests within the threshold period of time may indicate a greater probability that the email template is being incorporated in an unauthorized email.

In certain embodiments, the combination of multiple criteria may be used to obtain a value (e.g., a rating, a score) of the email template and indicative of the probability of the email template being used in an unauthorized email. By way of example, the value may be based on a quantity of mismatches between different types of information (e.g., a total quantity of mismatches is above a threshold quantity) and/or a degree of a mismatch between monitored and expected information (e.g., the monitored time stamp associated with a request is outside of the expected time stamp by greater than a threshold period of time). In certain embodiments, different types of information may have different effects on the value indicative of the probability of the email template being used in an unauthorized email. In other words, a first type of information may indicate an increased probability of the email template being used in an unauthorized email as compared to a second type of information. As an example, a quantity of mismatches between expected and monitored identifiers of electronic devices may change the value by a greater amount than that caused by the same quantity of mismatches between expected and monitored geographic locations of electronic devices. Further, the value may be compared with a threshold value to determine whether further action is to be taken. For instance, the value exceeding the threshold value may indicate that there is a sufficient probability the email template is being incorporated in an unauthorized email to cause further action to be taken (e.g., to mitigate the effect of unauthorized usage of the email template).

If a determination is made that the monitored information matches with the expected information (e.g., the monitored information is within a threshold), no further actions may be performed, and information associated with subsequent requests received by the server may be monitored. However, if a determination is made that the monitored information does not match with the expected information, at block 126, an action may be performed to mitigate the effects of the email template. In some embodiments, the action may include dynamically modifying the email template, such as by modifying the imagery stored on the server and retrieved in response to a request received by the server. A specific example may include replacing a company logo with a large stop sign and text warning of a potential phishing attempt. As a result, the imagery of the email using the email template may be modified to block the user from undesirably interacting with the email. For example, certain imagery of the email template may indicate that the email is fraudulent, is being sent by an unauthorized entity, and so forth, to discourage the user from interacting with the email (e.g., by providing information to the unauthorized electronic device).

In additional or alternative embodiments, specific recipients of an unauthorized email may be identified in order to perform a suitable action. For instance, a determination may be made regarding which specific recipients may have opened and/or downloaded the unauthorized email based on information associated with requests of the certain imagery (e.g., an identifier of a recipient electronic device, a geographic location) matching with recipient information stored on the server. That is, the information associated with requests received by the server may also be used to determine which recipients may have opened and/or downloaded the email template. In response, an action targeting the specifically determined recipients may be performed, such as to send a subsequent or follow up email to such recipients to warn users not to interact with the unauthorized email and/or to lock respective accounts of such recipients to block a user action from unintentionally affecting their account. By way of example, certain monitored information associated with a request may match with a first portion of recipient information associated with a specific user stored on the server, thereby indicating that the specific user has opened and/or downloaded the unauthorized email. In response, a second portion of the recipient information associated with the specific user may be utilized to determine an action to be performed, such as to contact the specific user (e.g., based on stored contact information associated with the specific user) and/or to modify an account of the specific user (e.g., based on stored account information associated with the specific user).

In further embodiments, an action may be taken to avoid subsequent email templates from being incorporated in an unauthorized email. As an example, the email template may be examined to determine why the email template is being incorporated in the unauthorized email (e.g., how the unauthorized electronic device possesses the email template) and/or why the email template is susceptible for incorporation in the unauthorized email, such as in comparison with other email templates. Indeed, historical usage of the email template may be analyzed to determine whether an email incorporating the email template may have been sent to a potentially unauthorized electronic device or otherwise used in a manner that enabled unauthorized possession of the email template. Further, email templates may be compared with one another to determine whether certain email templates being used in an unauthorized email include a common characteristic or measure that should not be incorporated in other email templates to avoid the incorporation of the other email templates in other unauthorized emails. Similarly, email templates may be compared with one another to determine whether certain email templates that are not being incorporated in an unauthorized email may include a common characteristic or measures that should be incorporated in other email templates to avoid the incorporation of the other email templates in other unauthorized emails. Therefore, different email templates may be reviewed to determine whether certain measures may be incorporated to block the email templates from being incorporated in unauthorized emails. A particular action to be performed may then be selected based on the determination of the email template being incorporated in an unauthorized email and to block the unauthorized email from affecting users that have received the unauthorized email.

In certain embodiments, a specific action may be selected (e.g., from a list of potential actions) based on the type of information in which the mismatch was identified. For example, a first action (e.g., sending follow up emails to identified recipients) may be performed based on a mismatch associated with a first type of information (e.g., a mismatch between a monitored identifier associated with a request and an expected identifier associated with the request). A second action (e.g., dynamically modifying the email template) may be performed based on a mismatch associated with a second type of information (e.g., a monitored number of requests received by the server exceeding a threshold number of requests). Indeed, the action may be selected and performed to address the specific manner in which the email template may be used by the unauthorized electronic device and better mitigate the effect associated with unauthorized usage of the email template.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A system, comprising:
a server storing a plurality of images configured to be presented in an email template on an electronic device, wherein the server is configured to:
receive a request from executable code of the email template to retrieve an image of the plurality of images for use in the email template;
acquire information associated with the request from the executable code;
compare the information associated with the request with expected information associated with the request to provide comparison results;
receive an additional request, subsequent to the request, from the executable code or additional executable code of the email template to retrieve the image or an additional image for use in the email template;
acquire additional information associated with the additional request from the executable code or the additional executable code;
compare the additional information associated with the additional request with additional expected information associated with the additional request to provide additional comparison results;
determine whether usage of the email template is authorized or unauthorized based on the comparison results and/or the additional comparison results;
in response to determining the usage of the email template to be unauthorized, respond to the request and/or the additional request with an unrequested image that is different from the image or the additional image to cause the unrequested image to be presented in the email template on the electronic device; and
in response to determining the usage of the email template to be authorized, respond to the request and/or the additional request with the image or the additional image to be presented in the email template on the electronic device.

2. The system of claim 1, wherein the server is configured to determine the usage of the email template to be unauthorized based on a mismatch between the information and the expected information.

3. The system of claim 1, wherein:
the information associated with the request includes a time of the request;
the expected information associated with the request includes an authorized time period; and
the server is configured to determine the usage of the email template to be unauthorized based on the comparison results indicating that the time of the request is outside of the authorized time period.

4. The system of claim 1, wherein:
the information associated with the request includes a quantity of times the request has been submitted;
the expected information associated with the request is indicative of a threshold quantity; and
the server is configured to determine the usage of the email template to be unauthorized based on the quantity of times the request has been submitted exceeding the threshold quantity.

5. The system of claim 1, wherein the server is configured to:
access user data associated with a plurality of users;
identify a user of the plurality of users associated with the electronic device on which the unrequested image is presented based on the information and the user data;
based on identifying the user, identify contact information associated with the user, account information associated with the user, or any combination thereof from the user data; and
in response to determining the usage of the email template to be unauthorized, contact the user via the contact information, modify the account information associated with the user, or any combination thereof.

6. The system of claim 5, wherein the server is configured to send an email to the user in response to determining the usage of the email template to be unauthorized, wherein the email is configured to inform the user of the usage of the email template being unauthorized.

7. The system of claim 1, wherein the information associated with the request from the executable code comprises a geographical location, an identifier, a language setting, or any combination thereof for a requesting electronic device transmitting the request to the server.

8. The system of claim 1, wherein the server is configured to:
identify a recipient of the email template based on detection of opening, downloading, or any combination thereof of the email template; and
block the recipient from additional interactions corresponding to the email template.

9. The system of claim 1, wherein the server is configured to:
identify a plurality of user accounts based on the information associated with the request; and
lock the plurality of user accounts in response to determining the usage of the email template to be unauthorized.

10. The system of claim 1, wherein the request comprises a globally unique identifier (GUID) associated with the image of the plurality of images.

11. The system of claim 1, wherein the unrequested image comprises a warning image, a text box indicating that an unauthorized email containing the email template is fraudulent, or a combination thereof.

12. The system of claim 1, wherein the executable code, the additional executable code, or a combination thereof are embedded in the email template.

13. A non-transitory computer-readable medium comprising instructions, wherein the instructions, when executed by processing circuitry, are configured to cause the processing circuitry to perform operations comprising:
receiving a request from executable code of an email template to retrieve an image for presentation in the email template;
receiving an additional request, subsequent to the request, from the executable code or additional executable code of the email template to retrieve the image or an additional image for presentation in the email template;
acquiring information associated with the request and acquiring additional information associated with the additional request;
comparing the information associated with the request with expected information associated with the request to provide comparison results;
comparing the additional information associated with the additional request with additional expected information associated with the additional request to provide additional comparison results;
determining whether usage of the email template is authorized or unauthorized based on the comparison results;

determining whether usage of the email template is authorized or unauthorized based on the additional comparison results;

in response to determining the usage of the email template to be unauthorized:

responding to the request by supplementing and/or inhibiting provision of the image; and/or responding to the additional request by supplementing and/or inhibiting provision of the image or the additional image; and in response to determining the usage of the email template to be authorized:

responding to the request with the image to be presented in the email template; and/or responding to the additional request with the image or the additional image to be presented in the email template.

14. The non-transitory computer-readable medium of claim 13, wherein supplementing and/or inhibiting provision of the image comprises responding to the request with an unrequested image that is different from the image to cause the unrequested image to be presented in the email template on an electronic device.

15. The non-transitory computer-readable medium of claim 13, wherein the information associated with the request comprises a first time stamp associated with transmission of the request, the expected information comprises a second time stamp indicative of an expected time of the transmission of the request, and the instructions, when executed by the processing circuitry, are configured to cause the processing circuitry to determine the usage of the email template to be unauthorized based on a difference between the first time stamp and the second time stamp exceeding a threshold period of time.

16. The non-transitory computer-readable medium of claim 13, wherein the instructions, when executed by the processing circuitry, are configured to cause the processing circuitry to perform the operations comprising:

determining a value associated with the email template based on comparison between the information and the expected information, wherein the value is indicative of a number of a set of mismatches between the information and the expected information, a degree of the set of mismatches, or any combination thereof; and determining the usage of the email template to be unauthorized in response to the value exceeding a threshold value.

17. A system, comprising:
processing circuitry; and
a memory comprising instructions, wherein the instructions, when executed by the processing circuitry, are configured to cause the processing circuitry to perform operations comprising:

receiving a request from executable code of an email template to retrieve an image of a plurality of images for use in the email template;

receiving an additional request, subsequent to the request, from the executable code or additional executable code of the email template to retrieve the image or an additional image of the plurality of images for use in the email template;

accessing information associated with the request and accessing additional information associated with the additional request;

comparing the information associated with the request with expected information associated with the request to provide comparison results;

comparing the additional information associated with the additional request with additional expected information associated with the additional request to provide additional comparison results;

determining whether usage of the email template is authorized or unauthorized based on the comparison results;

determining whether usage of the email template is authorized or unauthorized based on the additional comparison results;

in response to determining the usage of the email template is unauthorized;

responding to the request by supplementing and/or inhibiting provision of the image; and/or responding to the additional request by supplementing and/or inhibiting provision of the image or the additional image; and in response to determining the usage of the email template is authorized:

responding to the request with the image to be presented in the email template; and/or responding to the additional request with the image or the additional image to be presented in the email template.

18. The system of claim 17, wherein supplementing and/or inhibiting provision of the image comprises providing an unrequested image that is different from the image to cause the unrequested image to be presented in the email template on an electronic device receiving the email template.

19. The system of claim 17, wherein the information associated with the request is indicative of a first user transmitting the request, and the expected information is indicative of a second user expected to transmit the request, the first user being different than the second user.

20. The system of claim 17, wherein:
the comparison results comprise a mismatch between the information and the expected information; and
the instructions, when executed by the processing circuitry, are configured to cause the processing circuitry to perform the operations comprising:

determining a type of information contained in the mismatch; and selecting an action from a plurality of actions based on the type of information.

* * * * *